(12) United States Patent
Kohyama et al.

(10) Patent No.: US 7,318,906 B2
(45) Date of Patent: *Jan. 15, 2008

(54) METHOD FOR PRODUCING SIC FIBER-REINFORCED SIC COMPOSITE MATERIAL

(75) Inventors: Akira Kohyama, Uji (JP); Yutai Katoh, Uji (JP)

(73) Assignee: Japan Science and Technology Corporation, Saitama (JP)

( * ) Notice: Subject to any disclaimer, the term of this patent is extended or adjusted under 35 U.S.C. 154(b) by 407 days.

This patent is subject to a terminal disclaimer.

(21) Appl. No.: 10/478,797

(22) PCT Filed: Oct. 25, 2001

(86) PCT No.: PCT/JP01/09365

§ 371 (c)(1),
(2), (4) Date: Nov. 25, 2003

(87) PCT Pub. No.: WO02/098819

PCT Pub. Date: Dec. 12, 2002

(65) Prior Publication Data

US 2005/0001361 A1    Jan. 6, 2005

(30) Foreign Application Priority Data

May 31, 2001  (JP) ............................. 2001-164996

(51) Int. Cl.
*B28B 3/00* (2006.01)
*C04B 35/00* (2006.01)

(52) U.S. Cl. .................... 264/625; 264/640; 264/641; 264/642

(58) Field of Classification Search ............ 264/29.2, 264/29.3, 625, 640, 641, 642, 682
See application file for complete search history.

(56) References Cited

U.S. PATENT DOCUMENTS 5,439,627 A * 8/1995 De Jager ................. 264/129
5,707,471 A * 1/1998 Petrak et al. ............ 156/89.27

(Continued)

FOREIGN PATENT DOCUMENTS

EP    363070 A2    4/1990

(Continued)

OTHER PUBLICATIONS

Lacombe, et al., "Ceramic Matrix Composites, Key Materials for Future Space Plane Technologies", Second International Aerospace Planes Conference, Proc. AIAA-90-5208 (1990).

(Continued)

*Primary Examiner*—Carlos Lopez
(74) *Attorney, Agent, or Firm*—The Webb Law Firm

(57) ABSTRACT

A preformed of SiC fiber, which is coated with one or more of C, BN and SiC, is impregnated with a slurry, which suspends fine SiC powder and a sintering additive therein. The impregnated preform is hot-pressed at 1600-1800° C. with a pressure of 10 MPa or more. The sintering additive may be one or more of $Al_2O_3$, $Y_2O_3$, $SiO_2$ and CaO. The slurry may futher contain a silicone polymer selected from polycarbosilane, polyvinylsilane and polymethylsilane. Reaction of SiC fiber with a matrix is inhibited by the coating, so as to manufacture a SiC fiber-reinforced SiC-matrix composite remarkably improved in mechanical properties.

2 Claims, 1 Drawing Sheet

U.S. PATENT DOCUMENTS 5,824,281 A    10/1998    Ichikawa et al.

FOREIGN PATENT DOCUMENTS

| EP | 1024121 A2 | 8/2000 |
|---|---|---|
| JP | 02-199063 | 8/1990 |
| JP | 05-221739 | 8/1993 |
| JP | 08-143374 | 6/1996 |
| JP | 11-116337 | 4/1999 |
| JP | 11-130552 | 5/1999 |
| JP | 2001-010863 | 1/2001 |

OTHER PUBLICATIONS

Hollenberg, et al., "The effect of irradiation on the stability and properties of monolithic silicon carbide and SiC/SiC composites up to 25 dpa", Journal of Nuclear Materials, 219, (1995), pp. 70-86.

* cited by examiner

US 7,318,906 B2

METHOD FOR PRODUCING SIC FIBER-REINFORCED SIC COMPOSITE MATERIAL

INDUSTRIAL FIELD OF THE INVENTION

The present invention relates to a method of manufacturing a SiC fiber-reinforced SiC-matrix composite useful as structural members of aircraft, spacecraft, nuclear reactors, nuclear fusion reactors or the like, which are exposed to a high-temperature atmosphere or driven under heavy-duty conditions.

BACKGROUND OF THE INVENTION

Various ceramics such as SiC and $Si_3N_4$, which have good properties such as heat-resistance, chemical stability and mechanical strength, have been proposed so far for structural members for aircraft, spacecraft, nuclear reactors, nuclear fusion reactors, power plants which consume fossil fuel, or the like exposed to a severe atmosphere under heavy-duty conditions. Such ceramics are also used as members of heat exchangers or mechanical seals driven under heavy-duty conditions. Especially, SiC is a suitable material in various industrial fields from aerospace to nuclear power generation, due to its excellent heat-, corrosion- and wear-resistance as well as chemical stability and mechanical strength.

SiC is brittle itself, despite of good high-temperature property with a sublimation temperature higher than 2600° C. In order to overcome poor toughness, a SiC fiber-reinforced SiC-martix composite (hereinafter referred to as merely "a SiC composite") has been proposed, as reported in A. Lacombe and C. Bonnet, 2nd Int. Aerospace Planes Conf. Proc. AIAA-90-5208 (1990) and C. W. Hollenberg et al., J. Nucl. Mat., 219, (1995)70-86.

Several methods, e.g. hot-pressing and liquid-phase sintering, have been developed so far for manufacturing a SiC composite. However, since it is very difficult to manufacture a SiC composite having high mechanical strength and excellent rupture property, the same steps are necessarily repeated in order to improve properties of the SiC composite. Repetition of the same steps complicates a manufacturing process and raises a manufacturing cost. Moreover, members with complicated profiles can not be manufactured with ease due to repetition of the same steps. In this meaning, a SiC composite has not been available for industrial application, yet.

By the way, a liquid-phase sintering method has been proposed, whereby heat-resistant SiC fiber, which has quasi-stoichiometric composition with high crystallinity, is used for reinforcement and a matrix of a SiC composite is formed by liquid-phase sintering. The manufactured SiC composite has a dense structure with excellent thermal conductivity. However, there still remains un-solved problems for well-balancing rupture strength with toughness at high levels.

SUMMARY OF THE INVENTION

An object of the present invention is to manufacture a SiC composite, which has a dense structure with high strength, by one-step hot-pressing. Formation of the dense structure is realized by use of SiC fiber coated with carbon, boron nitride or silicon carbide.

According to the present invention, a slurry is prepared by suspension of fine SiC powder and a sintering additive. A preform of SiC fiber, which is coated with one or more of carbon, boron nitride and silicon carbide, is impregnated with the slurry. The impregnated preform (i.e. a prepreg) is then hot-pressed.

The sintering additive is one or more selected from $Al_2O_3$, $Y_2O_3$, $SiO_2$ and CaO. The slurry may further contain a silicone polymer such as polycarbosilane, polyvinylsilane and polymethylsilane.

When the prepreg, which is prepared by impregnation of a SiC fiber preform with the slurry, is hot-pressed at 1600-1800° C. with a pressure of 10 MPa or more, it is liquid-phase sintered to a dense and tough SiC composite.

BEST MODES OF THE INVENTION

Figure 1:
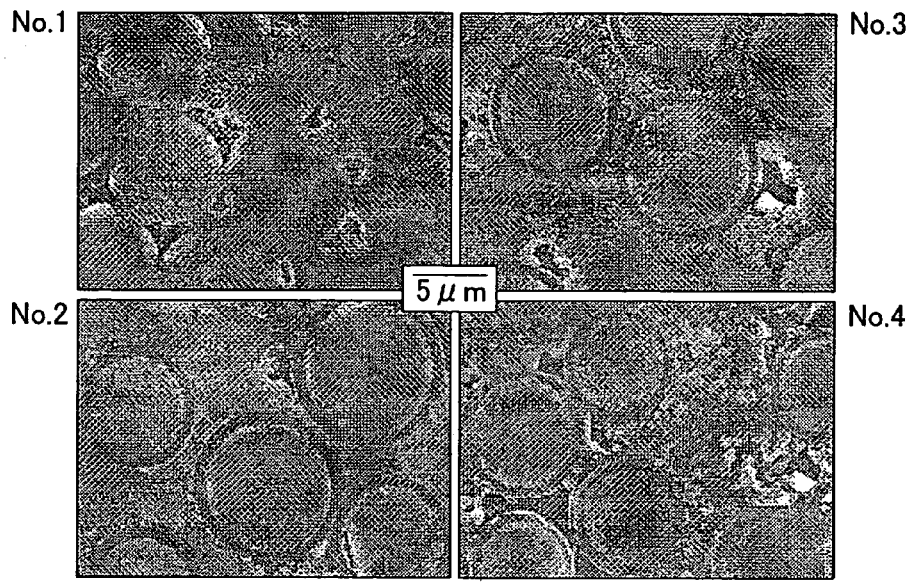
FIG. 1 is a microscopic view of several SiC composites for explaining an effect of a carbon coating on reaction between SiC fiber and a matrix.

SiC fiber, for reinforcement of SiC composite exposed to extreme environments, necessarily has quasi-stoichiometric composition, which controls impurities such as oxygen at lowest possible levels, with high crystallinity. However, the SiC fiber is often degraded or damaged by reaction with a matrix during sintering a prepreg of SiC fiber mixed with fine SiC powder. The reaction of SiC fiber with the matrix can be inhibited by coating the SiC fiber with one or more of carbon, boron nitride and/or silicon carbide according to the present invention.

The C, BN and/or SiC coating suppresses mutual diffusion between a matrix and SiC fiber and prevents SiC fiber from being damaged. The coating also advantageously controls rupture strength of SiC composite, since dispersion or discontinuation of cracks and pull-out of SiC filaments are promoted by the coating during collapse of the SiC composite. As a result, a SiC fiber preform impregnated with a slurry can be hot-pressed with a high pressure enough to densify the SiC composite.

A slurry for impregnation of a SiC fiber preform comprises fine SiC powder as a component for formation of a matrix and one or more sintering additives of $Al_2O_3$, $Y_2O_3$, $SiO_2$ and CaO. The sintering additive and SiC powder are converted to a transient liquid phase at 1800° C. or lower, resulting in promotion of sintering reaction and densification of a SiC composite.

The slurry may further contain a silicone polymer such as polycarbosilane, polyvinylsilane and polymethylsilane. Although particles in the slurry are hardly fed into fine cavities between SiC filaments, the silicone polymer infiltrates into the fine cavities and raises density of a manufactured SiC composite.

A SiC fiber preform impregnated with a slurry was hot-pressed to a SiC composite. A sintering temperature and a pressure are preferably determined within ranges of 1600-1800° C. and 10 MPa or more, respectively. A manufactured SiC composite is more densified as elevation of a sintering temperature and increase of an applied pressure. However, the sintering temperature shall be limited to 1800° C. at highest; otherwise SiC fiber would be significantly damaged even with a pressure of 10 MPa or so. SiC fiber is also damaged at an overpressure above 30 MPa. Damage of SiC fiber leads to decrease of mechanical strength of a product.

On the other hand, a matrix is insufficiently sintered with many cavities in a sintered body at a heating temperature lower than 1600° C. As a result, a product does not have properties suitable for the purpose. A pressure below 10 MPa is insufficient for reduction of cavities in a sintered body even at a sintering temperature of 1800° C. or so.

The other features of the present invention will be clearly understood from the following Example, referring to the drawings.

SiC fiber (offered as Tyranno™-SA by Ube Industries, Ltd.), which had quasi-stoichiometric composition with high crystallinity, was used as strengthening fiber. A C or BN coating of approximately 1 μm in thickness was formed on surfaces of SiC filaments by CVD process for vapor-depositing pyrolyzed carbon or boron nitride on the SiC filaments.

A slurry for impregnation of SiC fiber was prepared by dispersing fine β-SiC powder, $Al_2O_3$ (a sintering additive) of 0.3 μm in average particle size and polycarbosilane at a mass ratio of 4.5:0.5:5 in hexane (a solvent). A SiC fiber preform was impregnated with the slurry at a mass ratio of SiC fiber to the matrix-forming material being 4:6 by vacuum evacuation, Several impregnated SiC fiber preforms (prepregs) were individually set in a hot-pressing machine and hot-pressed under conditions shown in Table 1. Properties of manufactured SiC composites are also shown in Table 1.

results suggest that quasi-ductile fracture behavior was imparted to the SiC composite by the C coating.

Figure 2:
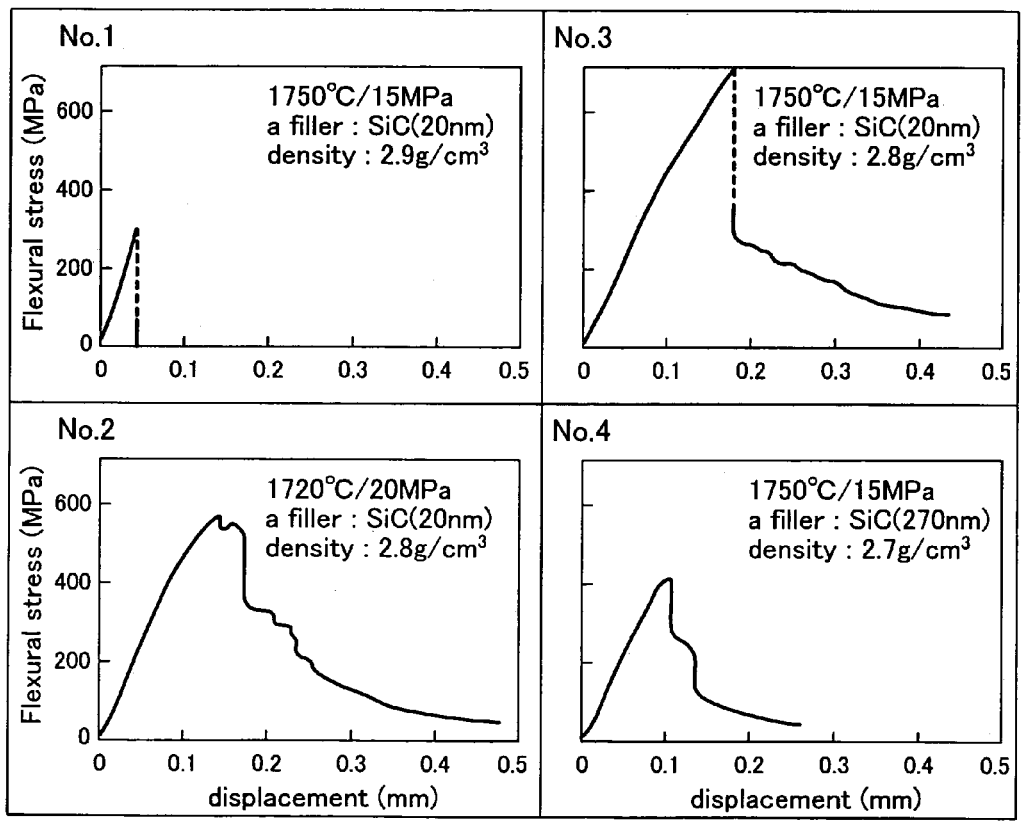
FIG. 2 is a graph showing stress-strain curves of several SiC composites for explaining remarkable improvement of strength of a SiC composite due to C-coated SiC fiber.

FIGS. 1 and 2 show the effects of C-coatings, but the same effects were also gained in case of hot-pressing a prepreg of BN-coated SiC fiber without reaction of the SiC fiber with a matrix. The resultant SiC composite had high mechanical strength.

INDUSTRIAL APPLICABILITY OF THE INVENTION

According to the present invention as above-mentioned, SiC fiber for use as reinforcement is coated with C, BN or the like to prevent SiC fiber from being damaged during sintering. As a result, a sintered body can be manufactured without degradation of inherent properties of a SiC fiber-reinforced SiC-matrix composite. Prevention of the SiC fiber from being damaged enables elevation of a sintering temperature and increase of a pressure during hot-pressing for further improvement of properties of the SiC composite. Consequently, the manufactured SiC composite is useful as structural members for aircraft, spacecraft, atomic reactors, atomic fusion reactors, power generating plants driven under heavy-duty conditions and so on.

TABLE 1

Conditions of Hot-Pressing and Properties of SiC Composite

| Sample No. | 1 | 2 | 3 | 4 | 5 | 6 |
|---|---|---|---|---|---|---|
| Coating SiC fiber with | no | C | C | C | BN | BN |
| thickness (μm) | — | 1 | 1 | 1 | 1 | 1 |
| A sintering temperature (° C.) | 1750 | 1720 | 1750 | 1750 | 1750 | 1750 |
| A pressure (MPa) | 15 | 20 | 15 | 15 | 20 | 15 |
| Particle size of β-SiC (nm) | 20 | 20 | 20 | 270 | 20 | 20 |
| Density (mg/m$^3$) | 2.9 | 2.8 | 2.8 | 2.7 | 2.9 | 2.8 |
| Flexural strength (MPa) | 251 | 559 | 628 | 438 | 603 | 588 |
| Flexural elasticity (GPa) | 242 | 160 | 181 | 131 | 239 | 185 |
| Flexural fracture energy (MJ/m$^2$) | 0.43 | 9.3 | 7.0 | 2.7 | 4.8 | 7.9 |

A SiC composite, which was manufactured by hot-pressing a prepreg of SiC fiber coated with C or BN at 1750° C. with a pressure of 15 MPa, had flexural strength and flexural fracture energy remarkably higher than a SiC composite Sample No. 1 manufactured from a prepreg of non-coated SiC fiber.

A structure of each SiC composite was observed by a scanning electron microscope (SEM) in order to research an effect of coatings on flexural properties. Results are shown in FIG. 1. As noted in the SiC composite Sample No. 1 using un-coated SiC fiber, the SiC fiber was heavily damaged due to its reaction with a matrix. On the other hand, the SiC composites Sample Nos. 2-4 maintained integrity of the SiC fiber due to C coatings, which completely inhibited reaction of the SiC fiber with a matrix. However, some cavities were detected in the matrix of the SiC composite Sample No. 4 without infiltration of β-SiC particles into gaps between SiC filaments, since the β-SiC particles were relatively big in size.

Each of Sample Nos. 1-4 was subjected to a three point-bending test for researching a stress-strain curve as shown in FIG. 2. It is apparently noted from comparison with the SiC composite Sample No. 1 that any of the SiC composites using C-coated SiC fiber had maximum load above its elastic limit and elongation after the maximum load. The

The invention claimed is:

1. A method of manufacturing a SiC fiber-reinforced SiC matrix composite, comprising the steps of:
    providing a fiber preform composed of a SiC fiber, said SiC fiber having a quasi-stoichiometric composition and coated with one or more coatings selected from the group consisting of carbon, boron nitride and silicon carbide;
    preparing a slurry by mixing fine SiC powder and a sintering additive with a silicone polymer, said sintering additive selected from the group consisting of $Al_2O_3$, $SiO_2$ and CaO;
    impregnating the fiber preform with the slurry; and
    hot-pressing the impregnated fiber preform at 1600° C. to 1800° C. with a pressure of between 10 MPa and 30 MPa, wherein the impregnated fiber preform is liquid-phase sintered to a SiC fiber-reinforced SiC matrix composite wherein the sintering additive and the fine SiC powder are converted to a liquid phase, resulting in promotion of the sintering reaction and densification of the SiC matrix composite.

2. The method according to claim 1, wherein the silicone polymer is one or more silicone polymers selected from the group consisting of polycarbosilane, polyvinylsilane and polymethylsilane.

* * * * *